US012784490B2

(12) United States Patent
Jiang et al.

(10) Patent No.: US 12,784,490 B2
(45) Date of Patent: Nov. 3, 2026

(54) ULTRASONIC SENSOR AND OPERATING METHOD THEREOF, AND ELECTRONIC DEVICE

(71) Applicant: Huawei Technologies Co., Ltd., Shenzhen (CN)

(72) Inventors: Tao Jiang, Shenzhen (CN); Yu Pang, Chengdu (CN); Xuying Chen, Shenzhen (CN); Yuanyuan Yu, Shenzhen (CN); Pengfei Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/312,969

(22) Filed: Aug. 28, 2025

(65) Prior Publication Data

US 2025/0378711 A1 Dec. 11, 2025

Related U.S. Application Data

(63) Continuation of application No. PCT/CN2024/077915, filed on Feb. 21, 2024.

(30) Foreign Application Priority Data

Mar. 1, 2023 (CN) ........................ 202310230226.X

(51) Int. Cl.
*G06V 40/13* (2022.01)
*G01S 7/52* (2006.01)

(52) U.S. Cl.
CPC ................................ *G06V 40/1306* (2022.01)

(58) Field of Classification Search
CPC ............ G06V 40/1306; G01S 15/8925; G01S 7/52079; G01S 15/89; H10N 30/802;
(Continued)

(56) References Cited

U.S. PATENT DOCUMENTS 10,275,634 B2 4/2019 Jeong et al.
11,087,107 B2 8/2021 Strohmann et al.
(Continued)

FOREIGN PATENT DOCUMENTS

CN 105900112 A 8/2016
CN 113168506 A 7/2021
(Continued)

OTHER PUBLICATIONS

Machine translation of CN115273156 (Year: 2022).*

*Primary Examiner* — Antonio Xavier
(74) *Attorney, Agent, or Firm* — Conley Rose, P.C.

(57) ABSTRACT

An ultrasonic sensor includes a substrate, and a circuit layer, a first electrode layer, a first piezoelectric layer, an intermediate electrode layer, a second piezoelectric layer, and a second electrode layer that are sequentially disposed on a same side of the substrate. The circuit layer includes a plurality of pixel circuits spaced from each other, the first electrode layer includes a plurality of electrode blocks spaced from each other, and the plurality of pixel circuits are correspondingly coupled to the plurality of electrode blocks. Polarization directions of the first piezoelectric layer and the second piezoelectric layer are the same.

19 Claims, 9 Drawing Sheets

(58) Field of Classification Search
CPC .... H10N 30/045; H10N 30/302; H10N 30/50; H10N 30/871; H10N 30/872
See application file for complete search history.

(56) References Cited

U.S. PATENT DOCUMENTS

| | | | | |
|---|---|---|---|---|
| 2018/0062067 | A1* | 3/2018 | Buck | H10N 30/87 |
| 2021/0013026 | A1* | 1/2021 | Jin | B24B 49/003 |
| 2022/0058357 | A1 | 2/2022 | Xu et al. | |

FOREIGN PATENT DOCUMENTS

| | | | |
|---|---|---|---|
| CN | 217085788 | U | 7/2022 |
| CN | 115273156 | A | 11/2022 |
| CN | 115711693 | A | 2/2023 |

* cited by examiner

ULTRASONIC SENSOR AND OPERATING METHOD THEREOF, AND ELECTRONIC DEVICE

CROSS-REFERENCE TO RELATED APPLICATIONS

This is a continuation of International Patent Application No. PCT/CN2024/077915, filed on Feb. 21, 2024, which claims priority to Chinese Patent Application No. 202310230226.X, filed on Mar. 1, 2023, both of which are incorporated by reference.

TECHNICAL FIELD

This disclosure relates to the field of sensing detection technologies, and in particular, to an ultrasonic sensor and an operating method thereof, and an electronic device.

BACKGROUND

In an ultrasonic sensor, an ultrasonic transceiver may be configured to send an ultrasonic wave to a to-be-detected object through an ultrasonic transmission medium, and receive an ultrasonic wave reflected back by the to-be-detected object, to complete detection on the to-be-detected object.

For example, in a fingerprint ultrasonic sensor, an ultrasonic wave may be sent by an ultrasonic transceiver to a finger, and reflected back to the ultrasonic transceiver based on different intensity at a ridge and a valley of a fingerprint. The reflected signal may be processed to generate a fingerprint image, to complete obtaining and recognition of the fingerprint image.

However, with diversification of application scenarios, higher performance of the ultrasonic sensor is required.

SUMMARY

Embodiments of this disclosure provide an ultrasonic sensor and an operating method thereof, and an electronic device, to improve performance of the ultrasonic sensor.

To achieve the foregoing objective, this disclosure uses the following technical solutions.

According to a first aspect of embodiments of this disclosure, an ultrasonic sensor is provided, including a substrate, a first ultrasonic transmit signal input port and a second ultrasonic transmit signal input port that are disposed on the substrate, and a circuit layer, a first electrode layer, a first piezoelectric layer, an intermediate electrode layer, a second piezoelectric layer, and a second electrode layer that are sequentially disposed on a same side of the substrate. The circuit layer includes a plurality of pixel circuits spaced from each other, the first electrode layer includes a plurality of electrode blocks spaced from each other, and the plurality of pixel circuits are correspondingly coupled to the plurality of electrode blocks. Polarization directions of the first piezoelectric layer and the second piezoelectric layer are the same, the first electrode layer and the second electrode layer both are coupled to the first ultrasonic transmit signal input port, and the intermediate electrode layer is coupled to the second ultrasonic transmit signal input port.

The ultrasonic sensor provided in this embodiment includes the first piezoelectric layer and the second piezoelectric layer, the first electrode layer on a side that is of the first piezoelectric layer and that is close to the substrate and the second electrode layer on a side that is of the second piezoelectric layer and that is away from the substrate both receive an excitation voltage transmitted by the first ultrasonic transmit signal input port, and therefore, the intermediate electrode layer located between the first piezoelectric layer and the second piezoelectric layer receives an excitation voltage transmitted by the second ultrasonic transmit signal input port. Therefore, directions of electric fields applied to the first piezoelectric layer and the second piezoelectric layer are opposite. The polarization directions of the first piezoelectric layer and the second piezoelectric layer are the same. Therefore, there is a half-wavelength phase difference between the first ultrasonic wave generated by the first piezoelectric layer and the second ultrasonic wave generated by the second piezoelectric layer. After passing through the intermediate electrode layer, the first ultrasonic wave and the second ultrasonic wave may be effectively superimposed. In this way, the transmitted ultrasonic wave and the echo signal are enhanced, to improve performance of the ultrasonic sensor.

In a possible implementation, a sum of thickness-to-wavelength ratios of the first piezoelectric layer to the second piezoelectric layer is greater than or equal to ¼+N, and is less than or equal to ¾+N, where N is an integer greater than or equal to 0. The sum of the thickness-to-wavelength ratios of the first piezoelectric layer to the second piezoelectric layer is limited to be greater than or equal to ¼+N and less than or equal to ¾+N, so that there is a half-wavelength phase difference between the first ultrasonic wave transmitted by the first piezoelectric layer and the second ultrasonic wave transmitted by the second piezoelectric layer. In this way, after passing through the film layers between the first piezoelectric layer and the second piezoelectric layer, the first ultrasonic wave and the second ultrasonic wave are effectively superimposed, so that loop sensitivity of the ultrasonic sensor can be increased, and fingerprint contrast can be improved, to improve performance of the ultrasonic sensor, so as to improve a recognition capability of the ultrasonic sensor.

In a possible implementation, a sum of thickness-to-wavelength ratios of the first piezoelectric layer to the second piezoelectric layer is less than ¼+N, where N is an integer greater than or equal to 0. The sum of the thickness-to-wavelength ratios of the first piezoelectric layer to the second piezoelectric layer is limited to be less than ¼+N, and in this case, after the first ultrasonic wave transmitted by the first piezoelectric layer and a second ultrasonic wave transmitted by the second piezoelectric layer pass through the intermediate stacked layer, mechanical, acoustic, or electrical crosstalk can be reduced and the signal-to-noise ratio is increased.

In a possible implementation, the intermediate electrode layer includes a first conducting layer, a connection layer, and a second conducting layer that are sequentially stacked; and the first conducting layer is disposed close to the first piezoelectric layer, and the second conducting layer is disposed close to the second piezoelectric layer. When the intermediate electrode layer includes the first conducting layer, the connection layer, and the second conducting layer, a frequency of the ultrasonic sensor may be adjusted by adjusting a thickness of the connection layer. Because a thickness of the conducting layer is not changed, the performance of the ultrasonic sensor is almost not affected, and the performance of the ultrasonic sensor 20 is decoupled from the frequency, so that a higher adaptability is implemented.

In a possible implementation, a material of the connection layer includes a conductive material or an insulating material. A selection range of the material of the connection layer is wide, and adaptability is strong.

In a possible implementation, the intermediate electrode layer is of a single-film layer structure. The intermediate electrode layer of the single-film layer structure facilitates application of an excitation voltage and grounding during detection of an echo signal, and has a simple structure and a small thickness.

In a possible implementation, the ultrasonic sensor further includes a protective layer disposed on a side that is of the second electrode layer and that is away from the substrate. The protective layer may protect the second electrode layer. In addition, the frequency of the ultrasonic sensor may be adjusted by adjusting a thickness of the protective layer.

In a possible implementation, the ultrasonic sensor further includes a reinforcement layer disposed on the side that is of the second electrode layer and that is away from the substrate. The reinforcement layer may provide a support force for the ultrasonic sensor. Module strength of the ultrasonic sensor may be enhanced by disposing the reinforcement layer. Especially when the substrate is a flexible substrate, an effect is more significant. In addition, it is found through simulation that a signal-to-noise ratio of the ultrasonic sensor can be further enhanced by disposing the reinforcement layer, to improve consistency of ultrasonic signals.

In a possible implementation, the first piezoelectric layer includes a plurality of first piezoelectric units spaced from each other, and the plurality of first piezoelectric units are disposed corresponding to the plurality of electrode blocks. The first piezoelectric layer is disposed as a structure including the plurality of first piezoelectric units, so that a crosstalk problem of the ultrasonic sensor can be optimized, sensitivity can be improved, and performance of the ultrasonic sensor can be further improved.

In a possible implementation, a projection of the first piezoelectric unit on the substrate covers a projection of the electrode block on the substrate. In this way, a signal receiving area of the first piezoelectric unit can be increased, to increase a signal value.

In a possible implementation, acoustic impedance at a gap between adjacent first piezoelectric units is different from acoustic impedance of the first piezoelectric unit. In this way, a crosstalk problem of the ultrasonic sensor can be further optimized, sensitivity can be improved, and performance of the ultrasonic sensor can be improved.

In a possible implementation, the second piezoelectric layer includes a plurality of second piezoelectric units spaced from each other, and the plurality of second piezoelectric units are disposed corresponding to the plurality of electrode blocks. The second piezoelectric layer is disposed as a structure including the plurality of second piezoelectric units, so that a crosstalk problem of the ultrasonic sensor can be further optimized, sensitivity can be improved, and performance of the ultrasonic sensor can be improved.

In a possible implementation, the first ultrasonic transmit signal input port and the second ultrasonic transmit signal input port are configured to receive different excitation voltages. This is a possible structure.

In a possible implementation, the ultrasonic sensor further includes an echo signal output port, and the circuit layer is coupled to the echo signal output port. This is a possible structure.

According to a second aspect of embodiments, an ultrasonic sensor is provided, including a substrate, and a first electrode layer, a first piezoelectric layer, an intermediate electrode layer, a second piezoelectric layer, and a second electrode layer that are sequentially disposed on a same side of the substrate. The first electrode layer includes a plurality of electrode blocks spaced from each other, and polarization directions of the first piezoelectric layer and the second piezoelectric layer are the same. A sum of thickness-to-wavelength ratios of the first piezoelectric layer to the second piezoelectric layer is greater than or equal to ¼+N, and is less than or equal to ¾+N. Alternatively, a sum of thickness-to-wavelength ratios of the first piezoelectric layer to the second piezoelectric layer is less than ¼+N. Herein, N is an integer greater than or equal to 0. This helps implement effective superposition of the first ultrasonic wave transmitted by the first piezoelectric layer and the second ultrasonic wave transmitted by the second piezoelectric layer, so that loop sensitivity and a signal-to-noise ratio of the ultrasonic sensor are improved, to improve performance of the ultrasonic sensor.

According to a third aspect of embodiments, an electronic device is provided, including an ultrasonic sensor and a printed circuit board, where the ultrasonic sensor is coupled to the printed circuit board, and the ultrasonic sensor includes the ultrasonic sensor according to any one of the first aspect and the second aspect.

In a possible implementation, the electronic device further includes a touch contact layer; and the touch contact layer is disposed on a side that is of the substrate and that is away from the second electrode layer. This is a possible structure.

In a possible implementation, the electronic device further includes a touch contact layer; and the touch contact layer is disposed on a side that is of the second electrode layer and that is away from the substrate. This is a possible structure.

In a possible implementation, the touch contact layer includes a display or a cover. This is a possible structure.

According to a fourth aspect of embodiments, an operating method of an ultrasonic sensor is provided, where the ultrasonic sensor includes a first ultrasonic transmit signal input port, a second ultrasonic transmit signal input port, a circuit layer, a first electrode layer, a first piezoelectric layer, an intermediate electrode layer, a second piezoelectric layer, and a second electrode layer that are disposed on a substrate; the circuit layer includes a plurality of pixel circuits spaced from each other; the first electrode layer includes a plurality of electrode blocks spaced from each other; and the plurality of pixel circuits are correspondingly coupled to the plurality of electrode blocks; polarization directions of the first piezoelectric layer and the second piezoelectric layer are the same; and the operating method includes: in a transmitter phase: The first ultrasonic transmit signal input port receives a first excitation voltage, and transmits the first excitation voltage to the first electrode layer and the second electrode layer; the second ultrasonic transmit signal input port receives a second excitation voltage, and transmits the second excitation voltage to the intermediate electrode layer; the first piezoelectric layer transmits a first ultrasonic wave under excitation of a first electric field formed by the first excitation voltage and the second excitation voltage on two sides of the first piezoelectric layer; and the second piezoelectric layer transmits a second ultrasonic wave under excitation of a second electric field formed by the second excitation voltage and the first excitation voltage on two sides of the second piezoelectric layer, where electric field directions of the first electric field and the second electric field are opposite; and in a receiver phase: The first piezoelectric layer undergoes deformation under excitation of a reflected ultrasonic wave, and converts the deformation into an electrical signal; and the circuit layer receives the electrical signal, and outputs the electrical signal via the echo signal output port.

DESCRIPTION OF EMBODIMENTS

Figure 1:
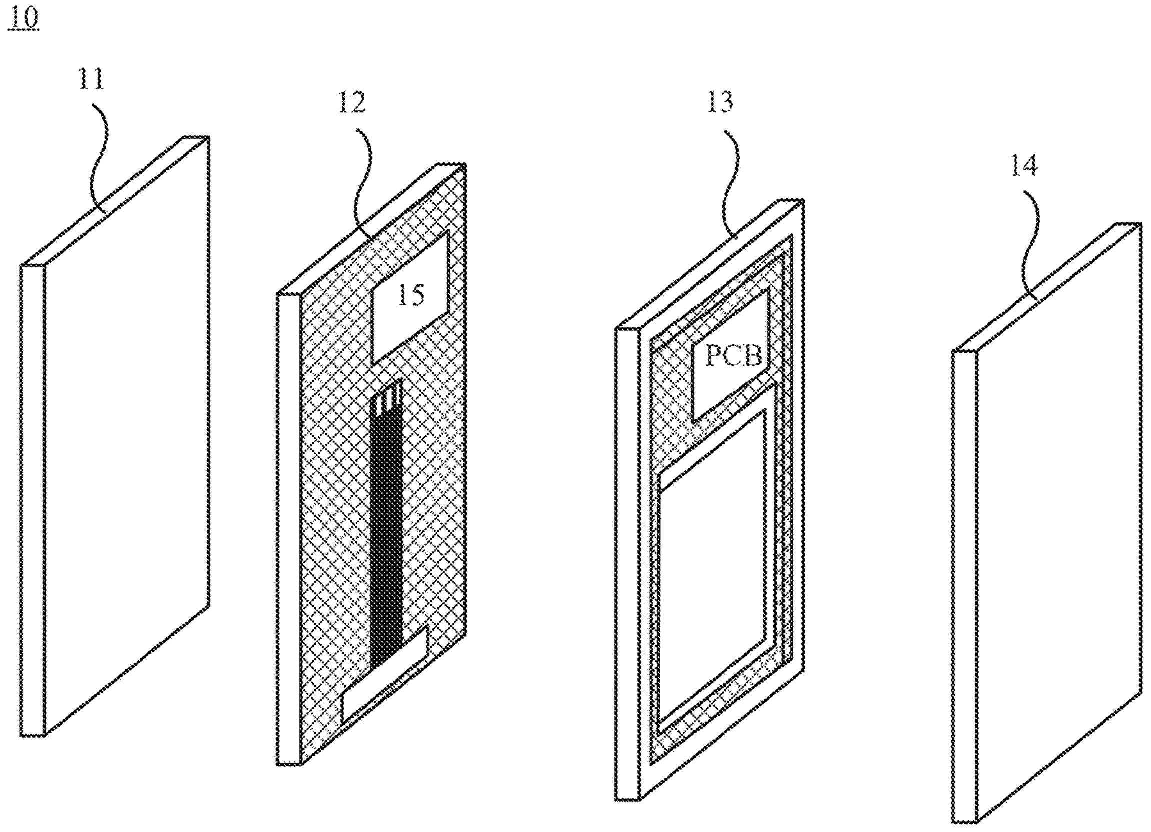
FIG. 1 is a diagram of an electronic device according to an embodiment.

The following describes the technical solutions in embodiments with reference to the accompanying drawings in embodiments. It is clear that the described embodiments are merely a part rather than all of embodiments of this disclosure.

Terms such as "second" and "first" below are only for ease of description, and cannot be understood as indicating or implying relative importance or implicitly indicating a quantity of indicated technical features. Therefore, a feature limited by "second", "first", or the like may explicitly or implicitly include one or more features. In the descriptions, unless otherwise stated, "a plurality of" means two or more.

In addition, in embodiments, orientation terms such as "upper", "lower", "left", and "right" may include but are not limited to definitions based on illustrated orientations in which components in the accompanying drawings are placed. It should be understood that, these directional terms may be relative concepts. They are used for description and clarification of relative locations, and may vary accordingly depending on a change in the orientations in which the components in the accompanying drawings are placed in the accompanying drawings.

In embodiments, unless otherwise clearly specified and limited, a term "connection" should be understood in a broad sense. For example, the "connection" may be a fixed connection, a detachable connection, or an integral connection, may be a direct connection, or may be an indirect connection through an intermediate medium. In addition, a term "coupling" may be a direct electrical connection, or may be an indirect electrical connection through an intermediate medium. A term "contact" may be direct contact or indirect contact through an intermediate medium.

In embodiments, "and/or" describes an association relationship between associated objects, and indicates that three relationships may exist. For example, A and/or B may indicate the following cases: Only A exists, both A and B exist, and only B exists, where A and B may be singular or plural. A character "/" generally indicates an "or" relationship between the associated objects.

As a mainstream interaction manner, biometric feature recognition (for example, fingerprint recognition) is widely applied to user identification, unlocking, secure payment, and the like on a mobile phone end, and has become an indispensable function of a current mobile phone. In addition, in daily home life, including scenarios such as a tablet, a laptop, a door lock, and the like, a user identity is confirmed through fingerprint recognition. In addition, a potential application burst point of fingerprint recognition is on an intelligent vehicle, for example, on a vehicle door handle. A user identity of a driver is authenticated through fingerprint recognition, to open a door of the vehicle, thereby thoroughly eliminating hassle of a vehicle key. In addition, fingerprint unlocking inside the vehicle may further include engine ignition. When the driver presses a button to start the vehicle, the vehicle performs authentication by using a fingerprint. More conveniently, fingerprint unlocking may be used, by recording information of different drivers and recording setting habits of the drivers in a driving process, to authenticate the different drivers after the vehicle is started, and load user habits and cockpit settings (such as a seat and a rear view mirror). For family members, it is a very friendly user experience improvement. Therefore, a biometric feature recognition technology has great research value.

An embodiment provides an electronic device. The electronic device has a biometric feature detection function for a pressing object. For example, a fingerprint, a palmprint, or a handprint of a hand may be detected. The electronic device is, for example, a consumer electronic product, a home electronic product, or a vehicle-mounted electronic product with a biometric feature detection function. The consumer electronic product is, for example, a mobile phone, a tablet computer (pad), a notebook computer, an e-reader, a personal computer (pPC), a personal digital assistant (PDA), a desktop display, a game device, a smart wearable product (for example, a smart watch, a smart band, or smart jewelry), a virtual reality (VR) terminal device, an augmented reality (AR) terminal device, an uncrewed aerial vehicle, an electronic database, or a bank automatic teller machine. The home electronic product is, for example, a smart door lock, a television, a remote control, a refrigerator, or a small charging home appliance (for example, a soy milk maker or a robot vacuum cleaner). The vehicle-mounted electronic product is, for example, a vehicle-mounted navigator, a vehicle-mounted high-density digital video disc (DVD), a vehicle door handle, or an engine ignition system. The electronic device may be an electronic device having a display function, or the electronic device may be an electronic device having no display function. This is not limited in embodiments.

The following uses an example in which the electronic device is a mobile phone for description.

FIG. 1 is a diagram of an electronic device according to an embodiment. As shown in FIG. 1, an electronic device 10 mainly includes a cover 11, a display 12, a middle frame 13, and a rear housing 14. The rear housing 14 and the display 12 are respectively located on two sides of the middle frame 13, the middle frame 13 and the display 12 are disposed in the rear housing 14, the cover 11 is disposed on a side that is of the display 12 and that is away from the middle frame 13, and a display surface of the display 12 faces the cover 11.

For example, the display 12 may be a low-temperature poly-silicon (LTPS) display, an active-matrix organic light-emitting diode (AMOLED) display, a low-temperature polycrystalline oxide (LTPO) display, a liquid-crystal display (LCD), or a micro light-emitting diode (micro LED) display. A type of the display 12 is not limited in embodiments. All displays having a touch display function are applicable to embodiments. The foregoing examples are merely examples.

In addition, as shown in FIG. 1, the electronic device 10 further includes a biometric feature recognition sensor 15, and the biometric feature recognition sensor 15 is disposed on a side of the display 12. The biometric feature recognition sensor 15 is configured to provide a biometric feature recognition function for the electronic device 10.

In addition, a person skilled in the art may understand that a structure of the electronic device 10 shown in the foregoing accompanying drawing does not constitute a limitation on the electronic device 10. The electronic device 10 may include more or fewer components than those shown in the figure, or a combination of a part of the components, or an arrangement of different components. For example, the electronic device 10 further includes components such as a printed circuit board (PCB), a battery, a camera, a microphone, a speaker, a radio frequency circuit, an input unit, a sensor, an audio circuit, a Wi-Fi module, a power supply, and a Bluetooth module. Details are not described herein.

Biometric recognition technologies have been widely applied to people's daily life. Due to features of human body fingerprint and palmprint information, for example, uniqueness, inability to obtain, and ease of use, a fingerprint recognition technology has become one of mainstream identity recognition technologies in fields such as consumer electronics, smart home, and industries. Currently, main fingerprint recognition technologies in the market mainly include a capacitive fingerprint recognition technology, an optical fingerprint recognition technology, and an ultrasonic fingerprint recognition technology.

Since 2018, an optical in-screen fingerprint technology has been gradually widely applied to an OLED display in-screen fingerprint due to its low costs and excellent performance. However, with continuous development of OLED display technologies, if the biometric feature recognition sensor 15 uses the optical in-screen fingerprint technology, the following problems may exist. Performance of an optical in-screen fingerprint module depends on transmittance of the OLED display. Overall transmittance of a common LTPS OLED display in the market is about 3%, and the transmittance is enough for use of the optical fingerprint module. However, with increasing market penetration of an LTPO OLED display technology and continuous development of emerging OLED screen technologies such as a color on encapsulation (COE) structure, transmittance of the OLED display is continuously decreased. This poses significant challenges to the optical in-screen fingerprint technology. In addition, a thickness of a module of a second-generation in-screen optical fingerprint that is currently the most cost-effective is 3 mm to 4 mm, and the thickness is large. As a result, a design of an entire electronic device is limited. In addition, due to the large thickness, the module cannot be used in a foldable-screen electronic device. In addition, when the optical in-screen fingerprint technology is used, a display pixel of a fingerprint recognition area needs to be first lighted up. In this case, pixel luminance of the area is high. If finger pressing has a specific deviation, dazzling due to light leakage may occur, and the problem is especially serious in a dark environment.

With development of the optical in-screen fingerprint technology, an ultrasonic in-screen fingerprint technology is also developing and applied to the market. An ultrasonic fingerprint recognition technology is a security authentication technology in which an ultrasonic wave is transmitted under a screen, and penetrates a stacked screen layer, to detect fingerprint information on an upper surface of the screen, and then is transmitted back to an original location, to reproduce the fingerprint information. In comparison with the optical in-screen fingerprint module, if the biometric feature recognition sensor 15 uses the ultrasonic in-screen fingerprint technology, an ultrasonic in-screen fingerprint module has the following advantages. The ultrasonic in-screen fingerprint technology does not depend on transmittance of a display, and can adapt to a current technology development trend of continuously decreasing transmittance of an OLED display. In addition, a thickness of the ultrasonic fingerprint module is small and is only 200 um to 300 um, which is conducive to an overall structure design of the electronic device, and may also be used in the foldable-screen electronic device. In addition, the ultrasonic in-screen fingerprint module has a faster recognition speed, and there is no problem like dazzling due to light leakage.

With development of screens, a penetration rate of a high-end LTPO/COE mobile phone increases year by year. In addition, currently, mobile phones have different forms, changing from a bar-type screen, a foldable screen, to a flexible screen, and different screen requirements lead to different stacked compositions. In addition, many users have a habit of attaching a tempered film, an anti-peeping film, and the like. However, regardless of screen composition, a structure with high loop sensitivity can intuitively meet application requirements in various scenarios. As a screen resolution requirement becomes higher, a decrease in optical transmittance makes the optical fingerprint recognition technology unsustainable. It is predicted that the ultrasonic fingerprint is mainly applied in the market in the future, and the ultrasonic fingerprint recognition technology is considered as a next-generation technology replacing a current mainstream optical fingerprint recognition technology.

In view of this, an embodiment provides an ultrasonic sensor. The ultrasonic sensor uses the ultrasonic in-screen fingerprint technology, and may be used as the biometric feature recognition sensor 15 in the electronic device 10.

Figure 2A:
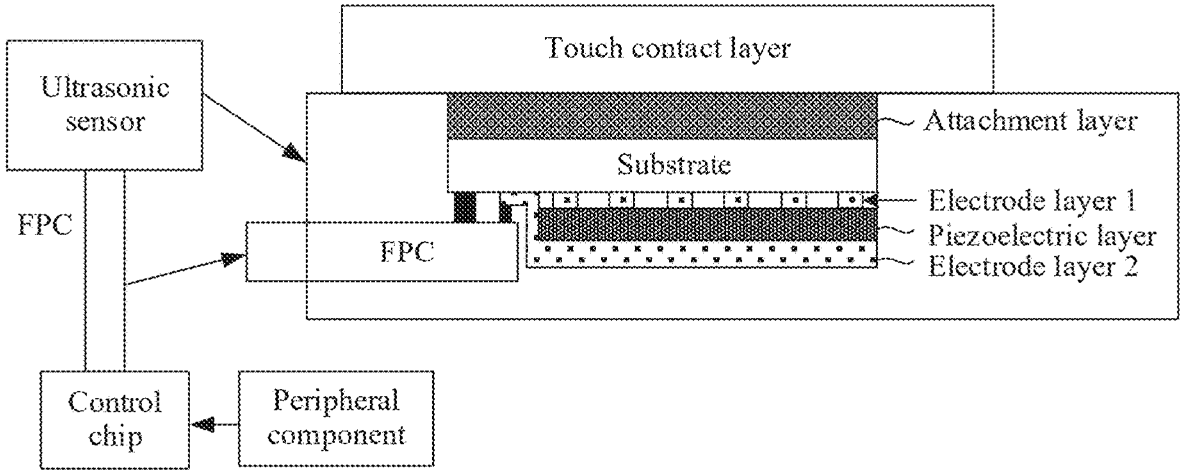
FIG. 2A is a diagram of a structure of an ultrasonic sensor according to an embodiment.

FIG. 2A is a diagram of a structure of an ultrasonic sensor according to an embodiment.

As shown in FIG. 2A, an ultrasonic sensor 20 includes an electrode layer 2, a piezoelectric layer, an electrode layer 1, and a substrate.

For example, the electrode layer 2 is formed by fully coating a surface with conductive silver paste, the piezoelectric layer is prepared by using a copolymer organic composite material that uses polyvinylidene fluoride (PVDF) as a core raw material, the substrate is a glass base plate, and the electrode layer 1 is an electrode array formed on the glass base plate.

When the ultrasonic sensor is used in the electronic device, as shown in FIG. 2A, the ultrasonic sensor is bonded to a touch contact layer through an attachment layer. The touch contact layer may be a display, a glass cover, a metal cover, or a cover of another type.

In practice, as shown in FIG. 2A, a back side of the ultrasonic sensor may be attached below the touch contact layer, that is, the substrate is attached below the touch contact layer through the attachment layer.

An operating process of the ultrasonic sensor is divided into a transmitter (TX) phase and a receiver (RX) phase. In the transmitter phase, a high-voltage pulse signal that is greater than 100 volts (V) and whose frequency ranges from 10 megahertz (MHz) to 20 MHz is output to the electrode layer 2 via a control chip and a peripheral element (in this case, the electrode layer 1 has a fixed level). The piezoelectric layer is subject to high electrostatic voltages on upper and lower sides, and generates high-frequency mechanical vibration, that is, an ultrasonic wave. The ultrasonic wave vibration is transferred to the touch contact layer through all layers until encountering a pressing object (for example, a finger) on a surface of the touch contact layer. A part of the ultrasonic wave is reflected by the pressing object, and a few part of the ultrasonic wave continues to propagate forward. In the receiver phase, the reflected ultrasonic wave passes through all the layers of medium again and reaches the piezoelectric layer. The piezoelectric layer that is nearly stationary is excited by the reflected ultrasonic wave to undergo deformation, and then the deformation is converted into a high-frequency pulse electrical signal. The electrical signal is received by the electrode layer 1 and then transferred to the control chip. Finally, a final ultrasonic-imaged image of the pressing object is obtained through the control chip.

However, screen types of mobile phones increase, especially foldable-screen or flexible-screen mobile phones, or even tempered films are used, resulting in an increase in stacked screen layers and an increase in impedance mismatch interfaces. This imposes a higher requirement on performance (e.g. penetration) of an ultrasonic module. Although the ultrasonic sensor shown in FIG. 2A can identify a pressing object, a penetration capability of the ultrasonic wave is insufficient, and the ultrasonic sensor is not applicable to a scenario in which a quantity of stacked touch contact layers increases.

Figure 2B:
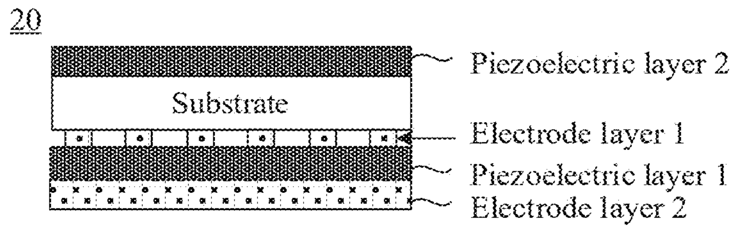
FIG. 2B is a diagram of a structure of another ultrasonic sensor according to an embodiment.

FIG. 2B is a diagram of a structure of another ultrasonic sensor according to an embodiment.

As shown in FIG. 2B, an embodiment further provides an ultrasonic sensor 20. The ultrasonic sensor 20 includes an electrode layer 2, a piezoelectric layer 1, an electrode layer 1, a substrate, and a piezoelectric layer 2.

After the ultrasonic sensor 20 is pressurized, the piezoelectric layer 2 is used as a transmitting layer to transmit an ultrasonic wave to a fingerprint. After being reflected by the fingerprint, an ultrasonic wave returns to the inside of the ultrasonic sensor 20. The piezoelectric layer 1 is used as a receiving layer to receive the reflected ultrasonic wave, and the electrode layer 1 converts a piezoelectric effect into an electrical signal for detection and recognition.

The ultrasonic sensor 20 shown in FIG. 2B includes the piezoelectric layer 1 and the piezoelectric layer 2. The piezoelectric layer 2 is used as the ultrasonic transmitting layer, the piezoelectric layer 1 is used as the ultrasonic receiving layer, and the substrate is further disposed between the piezoelectric layer 1 and the piezoelectric layer 2. Therefore, although the structure shown in FIG. 2B can improve a transmitting and receiving effect of the ultrasonic sensor 20 to some extent, the effect is not significant and cannot meet a requirement. It is found through simulation that performance of the ultrasonic sensor 20 depends on a physical film layer structure of the ultrasonic sensor 20 and an actual function of a film layer in the ultrasonic sensor 20. Similar film layer structures with different working principles make greatly different effects.

In view of this, an embodiment further provides an improved ultrasonic sensor, to improve an ultrasonic penetration capability of the ultrasonic sensor by increasing a quantity of piezoelectric layers used as transmitting layers.

The following uses several examples to describe a structure of the ultrasonic sensor provided in embodiments.

Example 1

Figure 3:
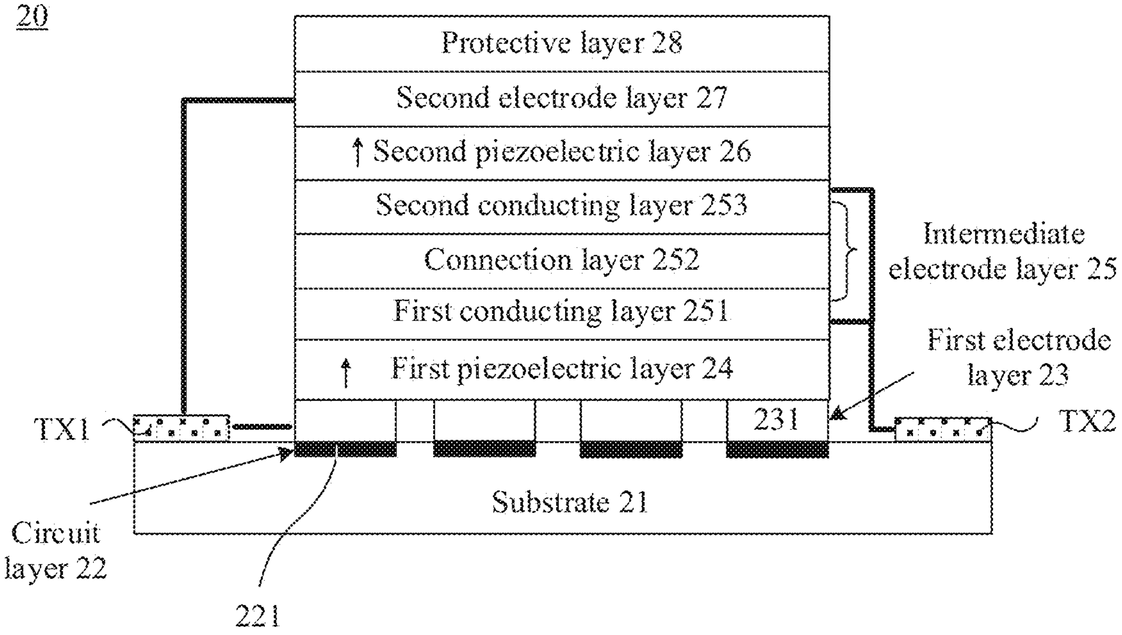
FIG. 3 is a diagram of a structure of still another ultrasonic sensor according to an embodiment.

FIG. 3 is a diagram of a structure of still another ultrasonic sensor according to an embodiment.

As shown in FIG. 3, an ultrasonic sensor 20 includes a substrate 21, and a circuit layer 22, a first electrode layer 23, a first piezoelectric layer 24, an intermediate electrode layer 25, a second piezoelectric layer 26, and a second electrode layer 27 that are disposed on a same side of the substrate 21.

For example, a material of the substrate 21 includes a polymer material like glass, a silicon wafer, polyimide (PI), or polyethylene terephthalate (PET). For example, the substrate 21 may be a glass base plate.

The circuit layer 22 includes a plurality of pixel circuits 221 spaced from each other. The pixel circuit 221 may be, for example, a circuit unit including an analog-digital module. The plurality of pixel circuits 221 may be, for example, arranged in an array.

The circuit layer 22 is disposed on a side of the substrate 21. When the substrate 21 is a silicon substrate, the substrate 21 and the circuit layer 22 may form a silicon chip. Structures of the substrate 21 and the circuit layer 22 are not limited in embodiments. Structures of the substrate 21 and the circuit layer 22 that are applicable to the ultrasonic sensor 20 in related technologies are all applicable to embodiments.

The first electrode layer 23 is disposed on a side that is of the circuit layer 22 and that is away from the substrate 21. The first electrode layer 23 includes a plurality of electrode blocks 231 spaced from each other. The plurality of electrode blocks 231 may be, for example, arranged in an array.

As shown in FIG. 3, the plurality of electrode blocks 231 and the plurality of pixel circuits 221 are correspondingly disposed. For example, the plurality of electrode blocks 231 are coupled to the plurality of pixel circuits 221 in a one-to-one correspondence, and an electrode block 231 and a pixel circuit 221 that are coupled to each other as a group form a pixel unit for fingerprint detection.

A material of the first electrode layer 23 may be a transparent conductive material or a non-transparent conductive material. For example, the material of the first electrode layer 23 includes a material like indium tin oxide (ITO), aluminum (Al), or copper (Cu), and the first electrode layer 23 is configured to respond to a reflected ultrasonic wave, so that a pattern signal of a fingerprint may be discretized, and point-column image restoration is implemented through pixelation.

The first piezoelectric layer 24 is disposed on a side that is of the first electrode layer 23 and that is away from the substrate 21, and the first piezoelectric layer 24 generates an ultrasonic wave under voltage excitation based on an inverse piezoelectric effect. In addition, a reflected echo may be converted into an electrical signal based on a piezoelectric effect.

In other words, in this embodiment, the first piezoelectric layer 24 is used as an ultrasonic transmitting layer, and is reused as an ultrasonic receiving layer.

A material of the first piezoelectric layer 24, for example, may include an organic polymer piezoelectric material like a polyvinylidene fluoride (PVDF), or polyvinylidene fluoride-trifluoroethylene (PVDF-TrFE); or may include an inorganic piezoelectric material like lead zirconate titanate (PZT), or aluminum nitride (AlN).

The intermediate electrode layer 25 is disposed on a side that is of the first piezoelectric layer 24 and that is away from the first electrode layer 23, and is disposed on a side that is of the second piezoelectric layer 26 and that is away from the second electrode layer 27. In an operating process of the ultrasonic sensor 20, a control chip provides excitation, the first piezoelectric layer 24 is disposed between the intermediate electrode layer 25 and the first electrode layer 23, and the first piezoelectric layer 24 transmits a first ultrasonic wave under excitation of a first electric field formed by the intermediate electrode layer 25 and the first electrode layer 23. The second piezoelectric layer 26 is disposed between the intermediate electrode layer 25 and the second electrode layer 27, and the second piezoelectric layer 26 transmits a second ultrasonic wave under excitation of a second electric field formed by the intermediate electrode layer 25 and the second electrode layer 27.

In some embodiments, as shown in FIG. 3, the intermediate electrode layer 25 includes a first conducting layer 251, a connection layer 252, and a second conducting layer 253 that are sequentially stacked.

The connection layer 252 is located between the first conducting layer 251 and the second conducting layer 253, and the first conducting layer 251 is connected to the second conducting layer 253 through the connection layer 252. The first conducting layer 251 is located on a side that is of the connection layer 252 and that is close to the first piezoelectric layer 24, and the second conducting layer 253 is located on a side that is of the connection layer 252 and that is close to the second piezoelectric layer 26.

Alternatively, it is understood that the first conducting layer 251 is disposed close to the first piezoelectric layer 24, and the second conducting layer 253 is disposed close to the second piezoelectric layer 26.

For example, under the excitation provided by the control chip, the first conducting layer 251 and the first electrode layer 23 form the first electric field, and the second conducting layer 253 and the second electrode layer 27 form the second electric field.

Materials of the first conducting layer 251 and the second conducting layer 253 may be the same as the material of the first electrode layer 23, and materials of the first conducting layer 251 and the second conducting layer 253 may be the same or may be different.

A material of the connection layer 252 is not limited in embodiments. The material of the connection layer 252 may include a conductive material. For example, the connection layer 252 may use a conductive adhesive, a conductive polymer, or a metal. The material of the connection layer 252 may alternatively include an insulation material. For example, the material of the connection layer 252 is insulation adhesive.

The second piezoelectric layer 26 is disposed on a side that is of the intermediate electrode layer 25 and that is away from the substrate 21, and the second piezoelectric layer 26 generates an ultrasonic wave under voltage excitation based on an inverse piezoelectric effect.

In other words, in this embodiment, the second piezoelectric layer 26 is used only as an ultrasonic transmitting layer, and is not used as an ultrasonic receiving layer.

A material of the second piezoelectric layer 26 may include, for example, an organic polymer piezoelectric material like PVDF or PVDF-TrFE; or may include an inorganic piezoelectric material like PZT or AlN.

In some embodiments, polarization directions of the first piezoelectric layer 24 and the second piezoelectric layer 26 are the same.

The polarization directions of the first piezoelectric layer 24 and the second piezoelectric layer 26 may face a side on which the substrate 21 is located, or may be away from the side on which the substrate 21 is located. This is not limited in embodiments.

A polarization direction refers to a direction in which uniform dipole moments are generated in a strong electric field. After polarization, a piezoelectric effect is presented. A polarization effect is evaluated by using a piezoelectric coefficient (pC/N). A polarization direction may be determined by testing a direction of a current generated by the piezoelectric effect, which reflects a direction of charge transfer.

For example, the material of the second piezoelectric layer 26 may be the same as the material of the first piezoelectric layer 24.

The second electrode layer 27 is disposed on a side that is of the second piezoelectric layer 26 and that is away from the substrate 21. A material of the second electrode layer 27 may include, for example, a conductive material like silver paste, indium tin oxide (ITO), aluminum (Al), or copper (Cu).

In some embodiments, as shown in FIG. 3, the ultrasonic sensor 20 further includes a first ultrasonic transmit signal input port TX1 and a second ultrasonic transmit signal input port TX2.

The first ultrasonic transmit signal input port TX1 and the second ultrasonic transmit signal input port TX2 are disposed on the substrate 21. The first ultrasonic transmit signal input port TX1 is configured to receive a first excitation voltage, the second ultrasonic transmit signal input port TX2 is configured to receive a second excitation voltage, and the first excitation voltage and the second excitation voltage are different excitation voltages. For example, the first excitation voltage and the second excitation voltage are a high-level signal and a low-level signal relative to each other.

Disposal locations of the first ultrasonic transmit signal input port TX1 and the second ultrasonic transmit signal input port TX2 on the substrate 21 are not limited in embodiments. FIG. 3 is merely an example.

In some embodiments, the first electrode layer 23 and the second electrode layer 27 both are coupled to the first ultrasonic transmit signal input port TX1, to receive the first excitation voltage (for example, a transmit instruction transmitted by the control chip to the ultrasonic sensor) received by the first ultrasonic transmit signal input port TX1.

The first electrode layer 23 and the second electrode layer 27 may be directly coupled to the first ultrasonic transmit signal input port TX1, or may be indirectly coupled to the first ultrasonic transmit signal input port TX1.

The intermediate electrode layer 25 is coupled to the second ultrasonic transmit signal input port TX2, to receive the second excitation voltage (for example, a transmit instruction transmitted by the control chip to the ultrasonic sensor) received by the second ultrasonic transmit signal input port TX2.

The intermediate electrode layer 25 may be directly coupled to the second ultrasonic transmit signal input port TX2, or may be indirectly coupled to the second ultrasonic transmit signal input port TX2.

Figure 4A:
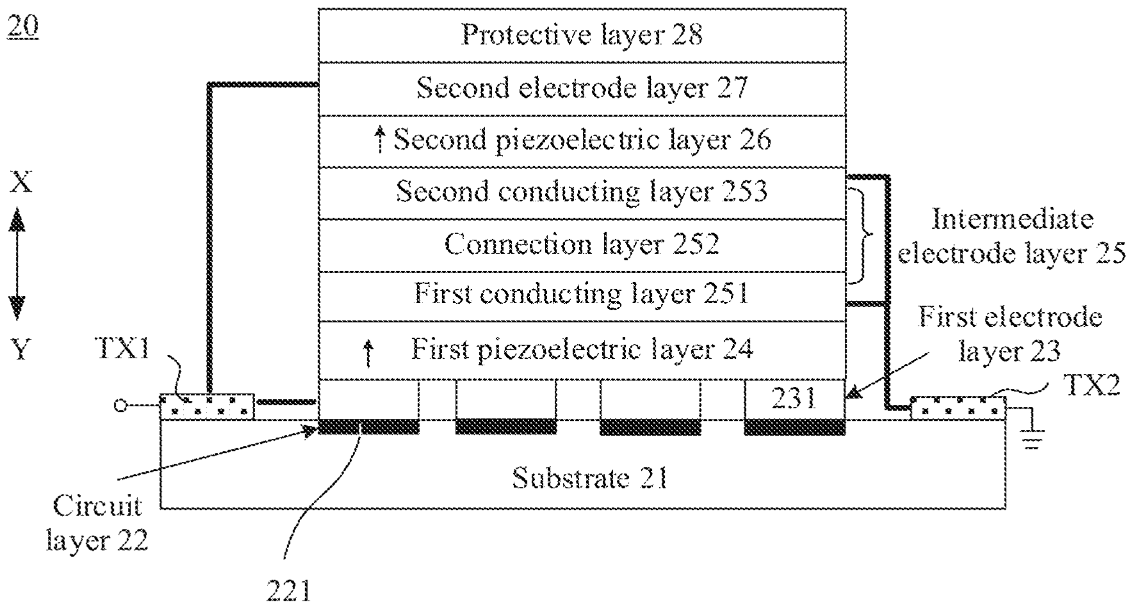
FIG. 4A is a diagram of signal reception of an ultrasonic sensor according to an embodiment.

For example, as shown in FIG. 4A, the first excitation voltage is a high-level excitation voltage, and the second excitation voltage is a low-level constant-voltage excitation voltage.

It may be understood that a high level and a low level in this embodiment are relative, and are not an absolute high level and an absolute low level. The low-level constant-voltage excitation voltage is a low-level signal relative to the high-level excitation voltage. Similarly, the high-level excitation voltage is a high-level signal relative to the low-level constant-voltage excitation voltage.

For example, the low-level constant-voltage excitation voltage is a reference ground voltage.

In this case, the first electrode layer 23 receives the high-level excitation voltage transmitted by the first ultrasonic transmit signal input port TX1, and the intermediate electrode layer 25 (including the first conducting layer 251 and the second conducting layer 253) receives the low-level constant-voltage excitation voltage transmitted by the second ultrasonic transmit signal input port TX2. The voltage on a lower side of the first piezoelectric layer 24 is high, and the voltage on an upper side of the first piezoelectric layer 24 is low, so that the first electric field of a first direction X (a direction that is of the first piezoelectric layer 24 and that is away from the substrate 21) is formed. The first piezoelectric layer 24 transmits the first ultrasonic wave under the excitation of the first electric field. The second electrode layer 27 receives the high-level excitation voltage transmitted by the first ultrasonic transmit signal input port TX1. The voltage on an upper side of the second piezoelectric layer 26 is high, and the voltage on a lower side of the second piezoelectric layer 26 is low, so that the second electric field of a second direction Y (a direction that is of the second piezoelectric layer 26 and that faces the substrate 21) is formed. The second piezoelectric layer 26 transmits the second ultrasonic wave under the excitation of the second electric field.

Figure 4B:
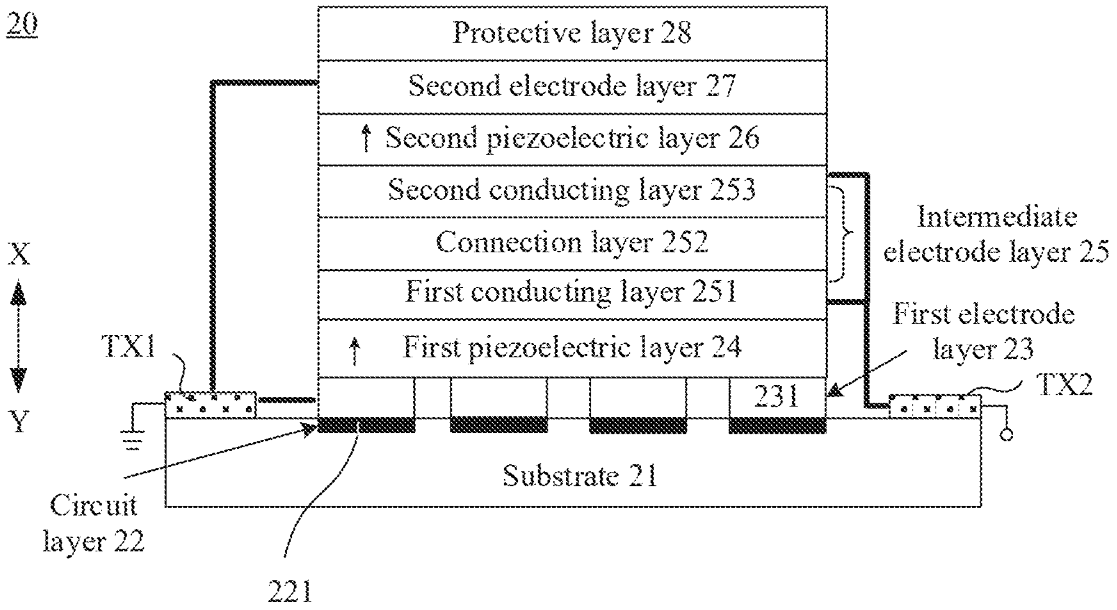
FIG. 4B is another diagram of signal reception of an ultrasonic sensor according to an embodiment.

Alternatively, for example, as shown in FIG. 4B, the first excitation voltage is a low-level constant-voltage excitation voltage, and the second excitation voltage is a high-level excitation voltage.

In this case, the first electrode layer 23 receives the low-level constant-voltage excitation voltage transmitted by the first ultrasonic transmit signal input port TX1, and the intermediate electrode layer 25 receives the high-level excitation voltage transmitted by the second ultrasonic transmit signal input port TX2. The voltage on a lower side of the first piezoelectric layer 24 is low, and the voltage on an upper side of the first piezoelectric layer 24 is high, so that the first electric field of a second direction Y is formed. The first piezoelectric layer 24 transmits the first ultrasonic wave under the excitation of the first electric field. The second electrode layer 27 receives the low-level constant-voltage excitation voltage transmitted by the first ultrasonic transmit signal input port TX1. The voltage on an upper side of the second piezoelectric layer 26 is low, and the voltage on a lower side of the second piezoelectric layer 26 is high, so that the second electric field of a second direction Y is formed. The second piezoelectric layer 26 transmits the second ultrasonic wave under the excitation of the second electric field.

It can be learned from the foregoing descriptions that the first electrode layer 23 and the second electrode layer 27 both receive the excitation voltage transmitted by the first ultrasonic transmit signal input port TX1, and the intermediate electrode layer 25 receives the excitation voltage transmitted by the second ultrasonic transmit signal input port TX2. Therefore, directions of electric fields applied to the first piezoelectric layer 24 and the second piezoelectric layer 26 are definitely opposite.

In this embodiment, the direction of the first electric field may face the substrate 21, and the direction of the second electric field may be away from the substrate 21; or the direction of the first electric field may be away from the substrate 21, and the direction of the second electric field may face the substrate 21, provided that the direction of the first electric field is opposite to the direction of the second electric field.

In some embodiments, the ultrasonic sensor 20 further includes an echo signal output port RX (not shown in the figure), and the circuit layer 22 is coupled to the echo signal output port RX. For example, each pixel circuit 221 at the circuit layer 22 is coupled to the echo signal output port RX.

For example, the array electrode block 231 at the first electrode layer 23 is configured to: collect an echo signal, and output the echo signal to the control chip via the echo signal output port RX. In this process, for example, the intermediate electrode layer 25 may remain in a grounded state, and the second electrode layer 27 may remain in a grounded state, or may be in a suspended state.

With reference to the structure of the ultrasonic sensor 20, the following uses an example to describe an operating method of the ultrasonic sensor provided in this embodiment.

The operating method of the ultrasonic sensor includes the following content.

In a Transmitter Phase:

The first ultrasonic transmit signal input port TX1 receives first excitation voltage, and transmits the first excitation voltage to the first electrode layer 23 and the second electrode layer 27. The second ultrasonic transmit signal input port TX2 receives the second excitation voltage, and transmits the second excitation voltage to the intermediate electrode layer 25. The first piezoelectric layer 24 transmits the first ultrasonic wave under the excitation of the first electric field formed by the first excitation voltage and the second excitation voltage on two sides of the first piezoelectric layer 24, and the second piezoelectric layer 26 transmits the second ultrasonic wave under the excitation of the second electric field formed by the second excitation voltage and the first excitation voltage on two sides of the second piezoelectric layer 26.

There is a half-wavelength phase difference between the first ultrasonic wave and the second ultrasonic wave, and directions of transmit waveforms of the first ultrasonic wave and the second ultrasonic wave are opposite. After passing through the intermediate electrode layer 25, the first ultrasonic wave and the second ultrasonic wave may be effectively superimposed as a transmitted ultrasonic wave. The first excitation voltage and the second excitation voltage are a high voltage and a low voltage relative to each other, and electric field directions of the first electric field and the second electric field are opposite.

In a Receiver Phase:

After the transmitted ultrasonic wave is transmitted, the transmitted ultrasonic wave is reflected by a to-be-detected object, and at least a part of the transmitted ultrasonic wave is reflected back to the inside of the ultrasonic sensor. The first piezoelectric layer 24 undergoes deformation under excitation of the reflected ultrasonic wave, and converts the deformation into an electrical signal; and the circuit layer 22 receives the electrical signal, and outputs the electrical signal via the echo signal output port RX. In this process, the intermediate electrode layer 25 may remain in a grounded state, and the second electrode layer 27 may remain in a grounded state or a suspended state.

Figure 5:
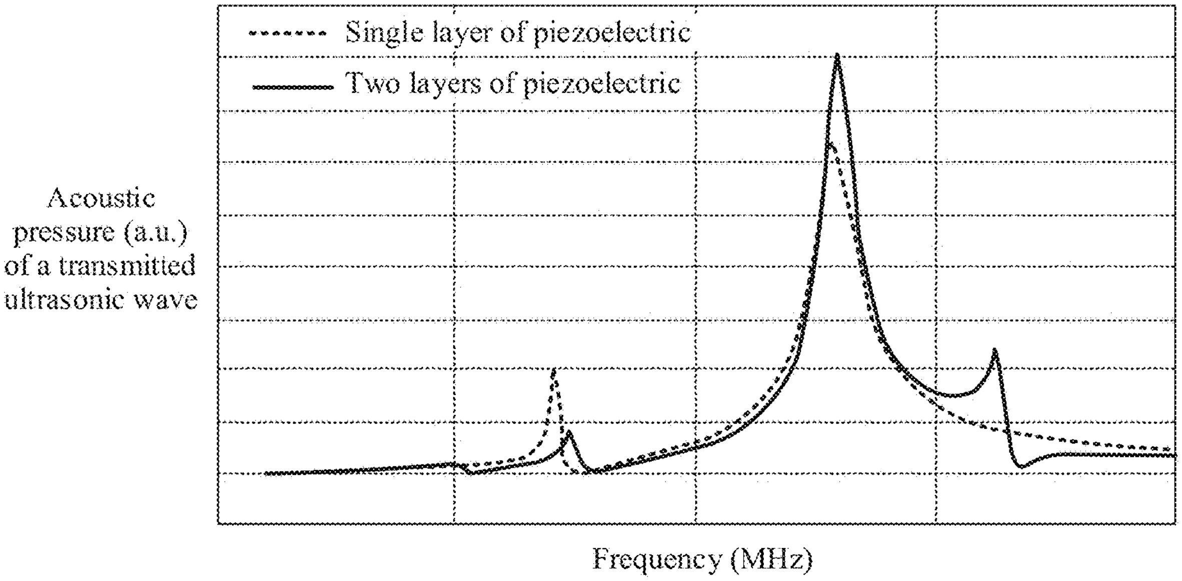
FIG. 5 is a spectrum diagram of an ultrasonic sensor including a single piezoelectric layer and an ultrasonic sensor including two piezoelectric layers according to an embodiment.

FIG. 5 is a spectrum diagram of the ultrasonic sensor including a single piezoelectric layer shown in FIG. 2A and the ultrasonic sensor including two piezoelectric layers shown in FIG. 3 according to an embodiment. A horizontal coordinate is a frequency, and a vertical coordinate is an acoustic pressure of a transmitted ultrasonic wave.

It is found through simulation that, under a condition of a same driving capability and a same resonance frequency, a transmit acoustic pressure of the ultrasonic sensor including two piezoelectric layers shown in FIG. 3 is significantly higher than a transmit acoustic pressure of the ultrasonic sensor including a single piezoelectric layer shown in FIG. 2A provided in this embodiment.

Figure 6:
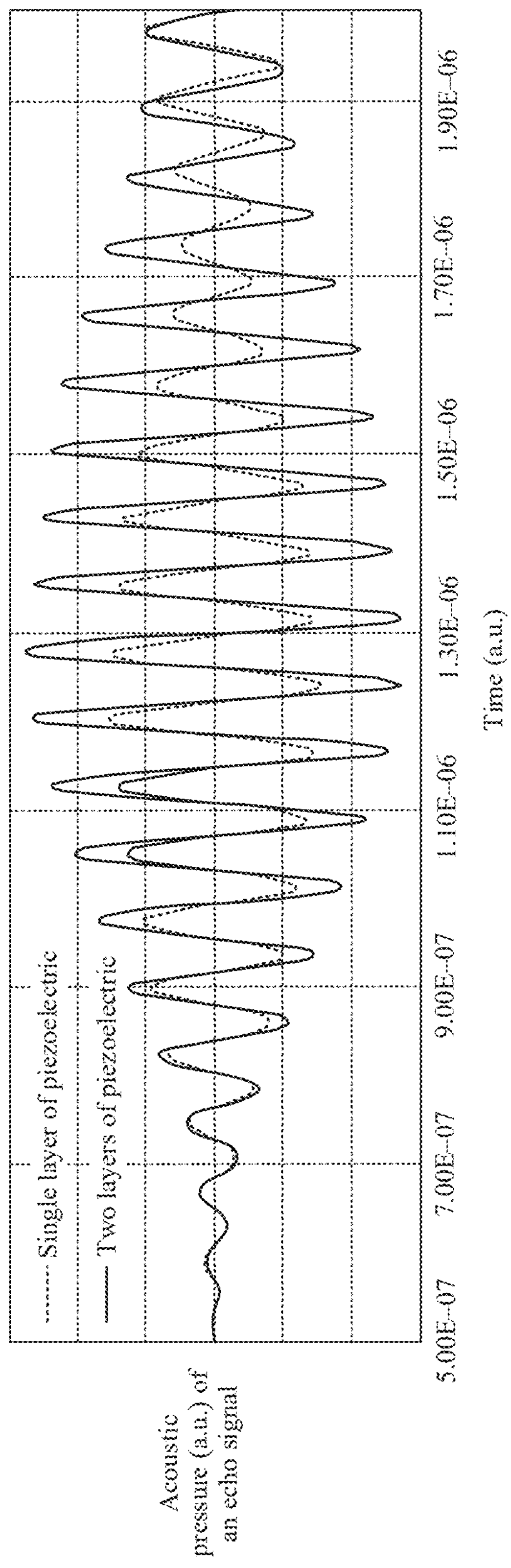
FIG. 6 is a time sequence diagram of echo signals of an ultrasonic sensor including a single piezoelectric layer and an ultrasonic sensor including two piezoelectric layers according to an embodiment.

FIG. 6 is a time sequence diagram of echo signals of the ultrasonic sensor including a single piezoelectric layer shown in FIG. 2A and the ultrasonic sensor including two piezoelectric layers shown in FIG. 3 according to an embodiment. A horizontal coordinate is time, and a vertical coordinate is an acoustic pressure of an echo signal.

It is found through simulation that, under a same condition, an echo acoustic pressure of the ultrasonic sensor including two piezoelectric layers shown in FIG. 3 is significantly higher than an echo acoustic pressure of the ultrasonic sensor including a single piezoelectric layer shown in FIG. 2A, and is nearly the double of the echo acoustic pressure of the ultrasonic sensor including a single piezoelectric layer.

In view of this, the ultrasonic sensor 20 provided in this embodiment includes the first piezoelectric layer 24 and the second piezoelectric layer 26, the first electrode layer 23 on a side that is of the first piezoelectric layer 24 and that is close to the substrate 21 and the second electrode layer 27 on a side that is of the second piezoelectric layer 26 and that is away from the substrate 21 both receive the excitation voltage transmitted by the first ultrasonic transmit signal input port TX1, and therefore, the intermediate electrode layer 25 located between the first piezoelectric layer 24 and the second piezoelectric layer 26 receives the excitation voltage transmitted by the second ultrasonic transmit signal input port TX2. Therefore, the directions of the electric fields applied to the first piezoelectric layer 24 and the second piezoelectric layer 26 are opposite. Polarization directions of the first piezoelectric layer 24 and the second piezoelectric layer 26 are the same. Therefore, after passing through the intermediate electrode layer 25, the first ultrasonic wave generated by the first piezoelectric layer 24 and the second ultrasonic wave generated by the second piezoelectric layer 26 may be effectively superimposed. In this way, the transmitted ultrasonic wave and the echo signal are enhanced, to improve performance of the ultrasonic sensor 20.

On this basis, when the intermediate electrode layer 25 includes the first conducting layer 251, the connection layer 252, and the second conducting layer 253, a frequency of the ultrasonic sensor 20 may be adjusted by adjusting a thickness of the connection layer 252. Because a thickness of the conducting layer is not changed, the performance of the ultrasonic sensor 20 is almost not affected, and the performance of the ultrasonic sensor 20 is decoupled from the frequency, so that a higher adaptability is implemented.

In some embodiments, the first piezoelectric layer 24, the intermediate electrode layer 25, the second piezoelectric layer 26, and the second electrode layer 27 each are of an entire-surface structure.

In this way, the ultrasonic sensor 20 is of a simple structure and uses a simple process.

In some embodiments, as shown in FIG. 3, the ultrasonic sensor 20 further includes a protective layer 28.

The protective layer 28 is disposed on a side that is of the second electrode layer 27 and that is away from the substrate 21, and the protective layer 28 is configured to protect the second electrode layer 27. In addition, the frequency of the ultrasonic sensor 20 may be adjusted by adjusting a thickness of the protective layer 28.

A material of the protective layer 28 is an insulating material, for example, may include a polymer material like PI or PET.

Figure 7:
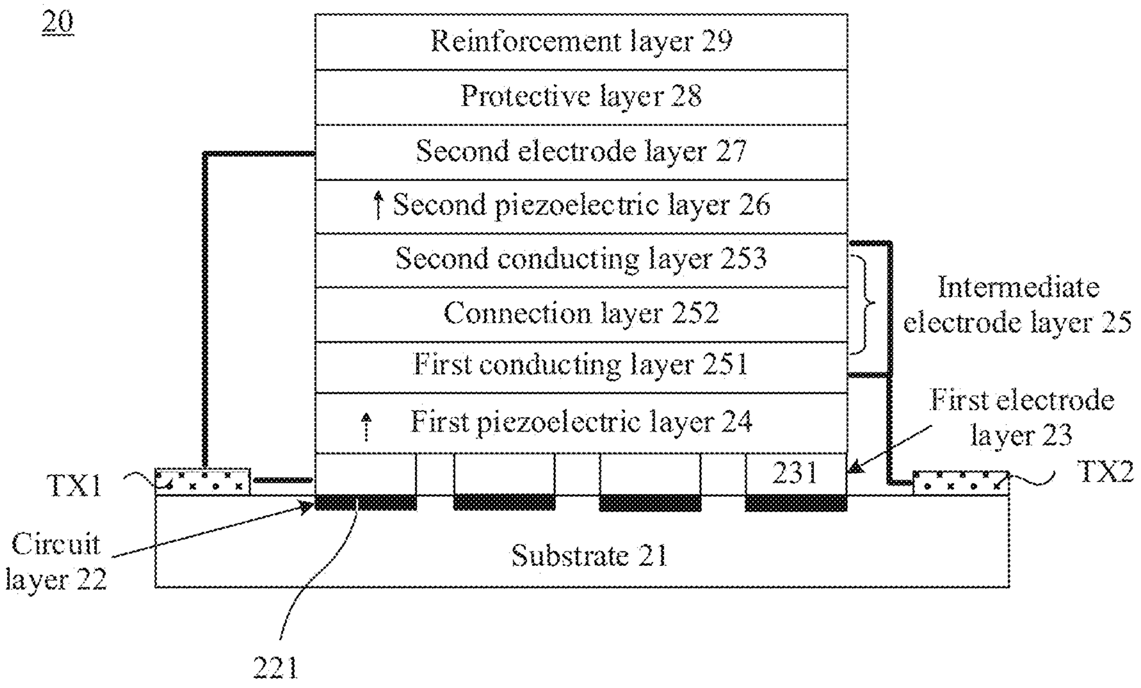
FIG. 7 is a diagram of a structure of yet another ultrasonic sensor according to an embodiment.

FIG. 7 is a diagram of a structure of yet another ultrasonic sensor according to an embodiment.

As shown in FIG. 7, an ultrasonic sensor 20 further includes a reinforcement layer 29, and the reinforcement layer 29 is disposed on a side that is of the second electrode layer 27 and that is away from the substrate 21.

For example, the reinforcement layer 29 is disposed on a side that is of the protective layer 28 and that is away from the second electrode layer 27. Alternatively, for example, the reinforcement layer 29 is disposed between the protective layer 28 and the second electrode layer 27.

A material of the reinforcement layer 29 may be, for example, metal, for example, the material of the reinforcement layer 29 includes Al or Cu.

The reinforcement layer 29 may provide a support force for the ultrasonic sensor 20. Module strength of the ultrasonic sensor 20 may be enhanced by disposing the reinforcement layer 29. Especially when the substrate 21 is a flexible substrate, an effect is more significant. In addition, it is found through simulation that a signal-to-noise ratio of the ultrasonic sensor 20 can be further enhanced by disposing the reinforcement layer 29, to improve consistency of ultrasonic signals.

In some embodiments, a sum of thickness-to-wavelength ratios of the first piezoelectric layer 24 to the second piezoelectric layer 26 is greater than or equal to $\frac{1}{4}+N$, and is less than or equal to $\frac{3}{4}+N$, where N is an integer greater than or equal to 0.

The thickness-to-wavelength ratio is a ratio of a thickness of a film layer to a length of an acoustic wave passing through the film layer. A wavelength of the first piezoelectric layer 24 is $\lambda 1=C1/f$, and the thickness-to-wavelength ratio of the first piezoelectric layer 24 is $R1=D1/\lambda 1$, where C1 is a wave velocity of the first piezoelectric layer 24, the wave velocity is related to the material of the first piezoelectric layer 24, f is a transmit frequency of the ultrasonic sensor, and D1 is the thickness of the first piezoelectric layer 24. Similarly, a wavelength of the first conducting layer 251 is $\lambda 2=C2/f$, and a thickness-to-wavelength ratio of the first conducting layer 251 is $R2=D2/\lambda 2$, where C2 is a wave velocity of the first conducting layer 251, the wave velocity is related to a material of the first conducting layer 251, and D2 is a thickness of the first conducting layer 251. Similarly, a wavelength of the connection layer 252 is $\lambda 3=C3/f$, and a thickness-to-wavelength ratio of the connection layer 252 is R3=D3/λ3, where C3 is a wave velocity of the connection layer 252, the wave velocity is related to the material of the connection layer 252, and D3 is the thickness of the connection layer 252. Similarly, a wavelength of the second conducting layer 253 is λ4=C4/f, and a thickness-to-wavelength ratio of the second conducting layer 253 is R4=D4/λ4, where C4 is a wave velocity of the second conducting layer 253, the wave velocity is related to the material of the second conducting layer 253, and D4 is a thickness of the second conducting layer 253. Similarly, a wavelength of the second piezoelectric layer 26 is λ5=C5/f, and a thickness-to-wavelength ratio of the second piezoelectric layer 26 is R5=D5/λ5, where C5 is a wave velocity of the second piezoelectric layer 26, the wave velocity is related to the material of the second piezoelectric layer 26, and D5 is a thickness of the second piezoelectric layer 26. In this case, the sum of the thickness-to-wavelength ratios of the first piezoelectric layer 24 to the second piezoelectric layer 26 is R=R1+R2+R3+R4+R5.

It should be emphasized that, when the thickness-to-wavelength ratio is calculated, the first piezoelectric layer 24 and the second piezoelectric layer 26 both are calculated from the middle of the film layer.

For example, a value of N is an integer like 0, 1, 2, 3, 4, 5, or 6.

The sum of the thickness-to-wavelength ratios of the first piezoelectric layer 24 to the second piezoelectric layer 26 is limited to be greater than or equal to ¼+N and less than or equal to ¾+N, so that there is a half-wavelength phase difference between the first ultrasonic wave transmitted by the first piezoelectric layer 24 and the second ultrasonic wave transmitted by the second piezoelectric layer 26. In this way, after passing through film layers between the first piezoelectric layer 24 and the second piezoelectric layer 26, the first ultrasonic wave and the second ultrasonic wave are effectively superimposed, so that loop sensitivity of the ultrasonic sensor 20 can be increased, and fingerprint contrast can be improved, to improve the performance of the ultrasonic sensor 20, so as to improve a recognition capability of the ultrasonic sensor 20.

Figure 8A:
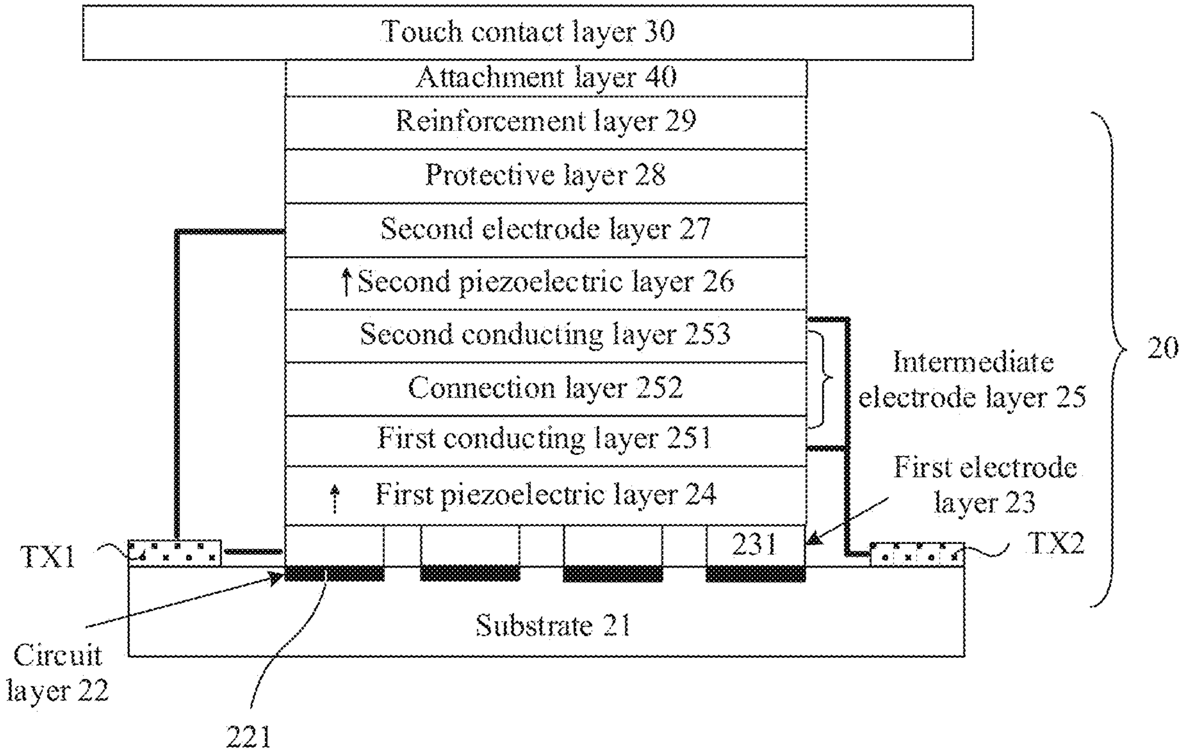
FIG. 8A and FIG. 8B are diagrams of an application scenario of an ultrasonic sensor 20 according to an embodiment.
Figure 8B:
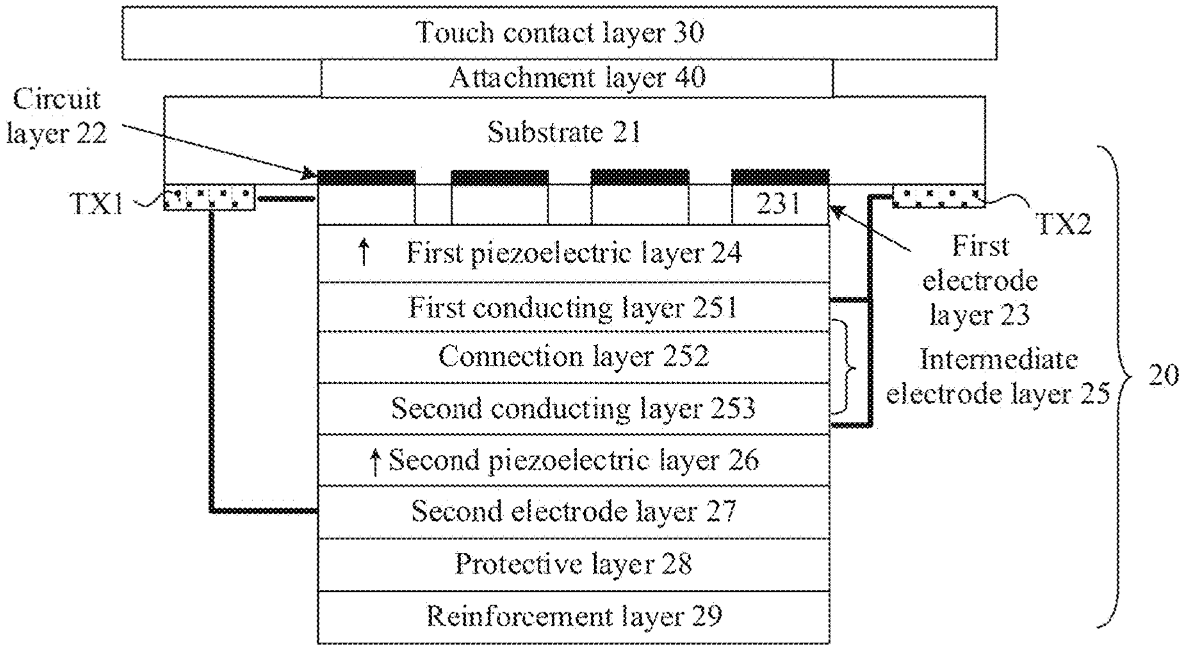

FIG. 8A and FIG. 8B are diagrams of an application scenario of an ultrasonic sensor 20 according to an embodiment.

As shown in FIG. 8A, when the ultrasonic sensor 20 is applied to the electronic device 10, a touch contact layer 30 in an electronic device 10 is connected to the ultrasonic sensor 20. The ultrasonic sensor 20 is configured to: transmit an ultrasonic wave to a side on which the touch contact layer 30 is located, and receive an ultrasonic wave reflected back by the touch contact layer 30.

In some embodiments, as shown in FIG. 8A, the touch contact layer 30 is disposed on a side that is of the second electrode layer 27 and that is away from the substrate 21. In other words, this is understood as what is commonly referred to front-side attachment in the art.

In some other embodiments, as shown in FIG. 8B, the touch contact layer 30 is disposed on a side that is of the substrate 21 and that is away from the second electrode layer 27. In other words, this is understood as what is commonly referred to back-side attachment in the art.

In some embodiments, the touch contact layer 30 is connected to the ultrasonic sensor 20 through an attachment layer 40.

A material of the attachment layer 40 is not limited in embodiments. Materials used to connect the touch contact layer 30 and the ultrasonic sensor 20 in related technologies are applicable to embodiments.

The attachment layer 40 may be, for example, an acoustic/mechanical coupling layer, the attachment layer 40 may be a homogeneous material, or the attachment layer 40 may be a composite material including a plurality of layers.

In some embodiments, the touch contact layer 30 is a display.

For example, the touch contact layer 30 may be a multi-stack composite material like a rigid display, a flexible display, a curved display, a 2.5D display, or a 3D display.

In some other embodiments, the touch contact layer 30 is a cover.

For example, the touch contact layer 30 may be a cover like a curved cover glass, a flat cover glass, a metal cover, or a glass-cover polymer region cover.

A finger is used as an example. The finger includes a fingerprint valley and a fingerprint ridge. In a fingerprint information recognition process, when an ultrasonic wave is transmitted by the ultrasonic sensor 20, penetrates the touch contact layer 30, and reaches a finger fingerprint interface, because an acoustic impedance difference between a fingerprint valley and a fingerprint ridge is very large, acoustic pressure reflectivity varies greatly at different interface locations when the touch contact layer 30 is touched. Therefore, echo signal strengths of the fingerprint ridge and the fingerprint valley are different. After reaching the first piezoelectric layer 24, these echo signals may be converted into vibration signals. After difference signals at different locations are received by the pixelized electrode blocks 231, the fingerprint image is restored through subsequent circuit collection and signal processing.

Figure 9:
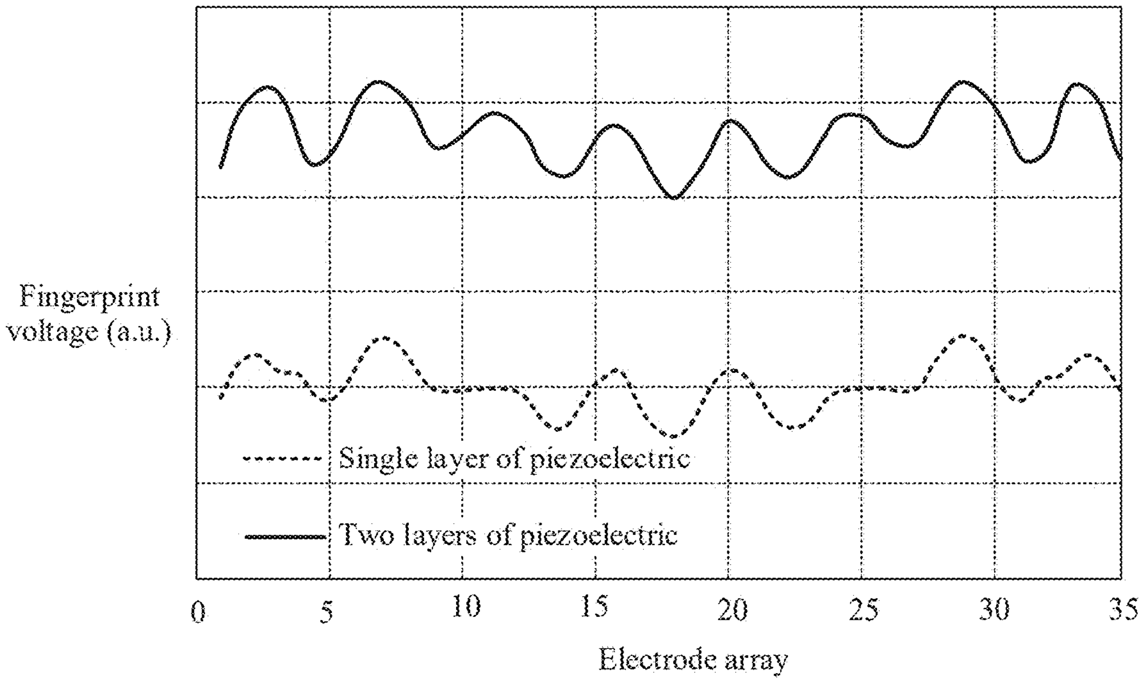
FIG. 9 is a comparison diagram of fingerprint imaging effects of an ultrasonic sensor including a single piezoelectric layer and an ultrasonic sensor including two piezoelectric layers.

FIG. 9 is a comparison diagram of fingerprint imaging effects of an ultrasonic sensor including a single piezoelectric layer and an ultrasonic sensor including two piezoelectric layers.

As shown in FIG. 9, it can be learned that after waveforms of two piezoelectric layers are superimposed, an actually detected fingerprint image is significantly improved. Valley-ridge signal difference calculation is performed on echo signals of 35 electrodes, and it is found that an average valley-ridge signal difference is increased to 1.4 times that of a single piezoelectric layer, and a signal-to-noise ratio is also increased by 10%. On an average voltage where the fingerprint signal resides, signal strength are improved by more than two times. These comprehensive parameter improvements improve comprehensive performance of fingerprint imaging.

Example 2

In comparison with Example 1, in Example 2, the intermediate electrode layer 25 is of a single-film layer structure.

Figure 10:
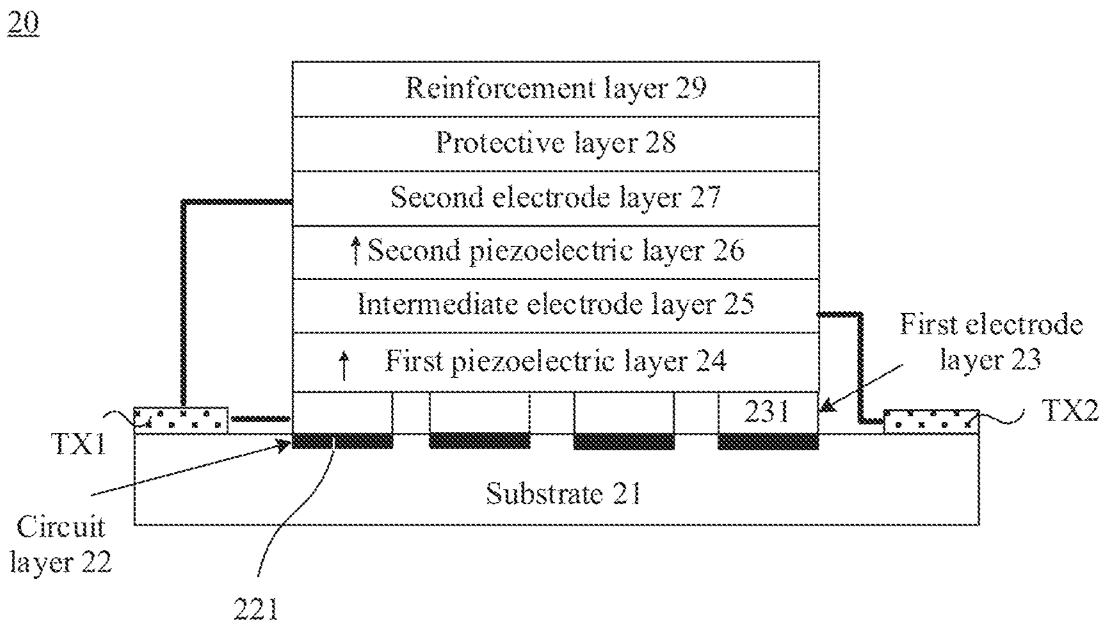
FIG. 10 is a diagram of a structure of still yet another ultrasonic sensor according to an embodiment.

FIG. 10 is a diagram of a structure of still yet another ultrasonic sensor according to an embodiment.

As shown in FIG. 10, an ultrasonic sensor 20 includes a substrate 21, and a circuit layer 22, a first electrode layer 23, a first piezoelectric layer 24, an intermediate electrode layer 25, a second piezoelectric layer 26, and a second electrode layer 27 that are disposed on a same side of the substrate 21.

For structures of the substrate 21, the circuit layer 22, the first electrode layer 23, the first piezoelectric layer 24, the second piezoelectric layer 26, and the second electrode layer 27, refer to related descriptions in Example 1. Details are not described herein again.

In this example, the intermediate electrode layer 25 is of a single-film layer structure.

The intermediate electrode layer 25 of the single-film layer structure facilitates application of an excitation voltage and grounding during detection of an echo signal, and has a simple structure and a small thickness.

In some embodiments, a sum of thickness-to-wavelength ratios of the first piezoelectric layer 24 to the second piezoelectric layer 26 is greater than 0 and less than ¼+N.

Figure 11:
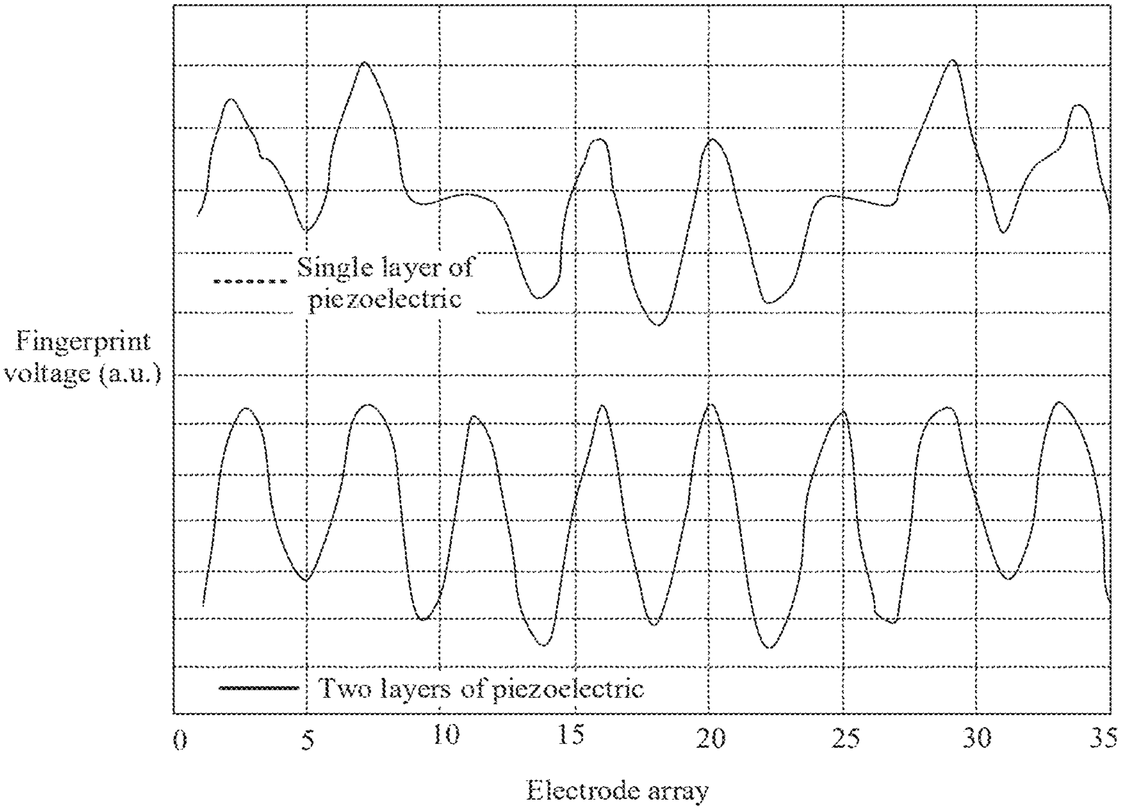
FIG. 11 is a comparison diagram of fingerprint imaging effects of an ultrasonic sensor including a single piezoelectric layer and an ultrasonic sensor including two piezoelectric layers.

FIG. 11 is a comparison diagram of fingerprint imaging effects of an ultrasonic sensor including a single piezoelectric layer and an ultrasonic sensor including two piezoelectric layers.

As shown in FIG. 11, it can be clearly seen that the sum of thickness-to-wavelength ratios of the first piezoelectric layer 24 to the second piezoelectric layer 26 is less than ¼+N, an actually detected fingerprint image signal ratio is significantly improved, and consistency is improved. Valley-ridge signal difference calculation is performed on echo signals of 35 electrodes, and an acoustic module signal difference (SSNR) is calculated based on a signal difference. It is found that the signal difference increases from 3.4 to about 16.9, that is, increases by about four times in total. Improvement of consistency of an original signal is of great significance to signal-to-noise ratio optimization of a subsequent fingerprint image.

Therefore, the sum of the thickness-to-wavelength ratios of the first piezoelectric layer 24 to the second piezoelectric layer 26 is limited to be less than ¼+N and in this case, after a first ultrasonic wave transmitted by the first piezoelectric layer 24 and a second ultrasonic wave transmitted by the second piezoelectric layer 26 pass through the intermediate stacked layer, mechanical, acoustic, or electrical crosstalk can be reduced and the signal-to-noise ratio is increased.

In some embodiments, the ultrasonic sensor 20 further includes a protective layer 28.

In some embodiments, the ultrasonic sensor 20 further includes a reinforcement layer 29.

Example 3

In comparison with Example 1 and Example 2, in Example 3, at least one of the first piezoelectric layer 24, the second piezoelectric layer 26, the intermediate electrode layer 25, and the second electrode layer 27 is an array structure.

Figure 12:
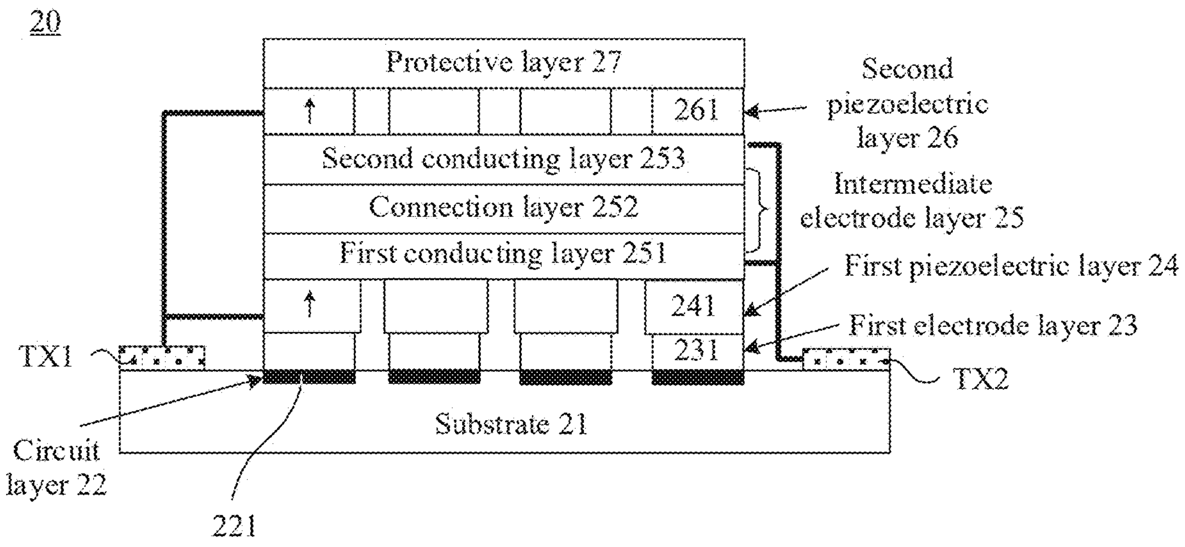
FIG. 12 is a diagram of a structure of a further ultrasonic sensor according to an embodiment.

FIG. 12 is a diagram of a structure of a further ultrasonic sensor according to an embodiment.

As shown in FIG. 12, an ultrasonic sensor 20 includes a substrate 21, and a circuit layer 22, a first electrode layer 23, a first piezoelectric layer 24, an intermediate electrode layer 25, a second piezoelectric layer 26, and a second electrode layer 27 that are disposed on a same side of the substrate 21.

The first piezoelectric layer 24 includes a plurality of first piezoelectric units 241 spaced from each other, and the plurality of first piezoelectric units 241 are disposed corresponding to a plurality of electrode blocks 231.

For example, the plurality of first piezoelectric units 241 are arranged in an array, and the plurality of first piezoelectric units 241 are disposed in a one-to-one correspondence with the plurality of electrode blocks 231. In a first piezoelectric unit 241 and an electrode block 231 that are correspondingly disposed as a group, the electrode block 231 can respond to a piezoelectric effect of the first piezoelectric unit 241. Alternatively, it is understood that an area in which the electrode blocks 231 are located is divided into pixel units, and a first piezoelectric unit 241 and an electrode block 231 are correspondingly disposed as a group in each pixel unit.

For example, a projection of the first piezoelectric unit 241 on the substrate 21 overlaps a projection of the electrode block 231 on the substrate 21.

Optionally, a pattern of the first piezoelectric unit 241 is greater than a pattern of the electrode block 231.

For example, the projection of the first piezoelectric unit 241 on the substrate 21 covers the projection of the electrode block 231 on the substrate 21. Alternatively, it is understood that the projection of the electrode block 231 on the substrate 21 is located in the projection of the first piezoelectric unit 241 on the substrate 21.

Correspondingly, for example, a distance of a second gap between adjacent first piezoelectric units 241 is less than a distance of a first gap between adjacent electrode blocks 231. Alternatively, it is understood that the first electrode layer 23 includes a first hollow pattern, and the first hollow pattern is divided into a plurality of electrode blocks 231. The first piezoelectric layer 24 includes a second hollow pattern, and the second hollow pattern is divided into a plurality of first piezoelectric units 241. A projection of the first hollow pattern on the substrate 21 covers a projection of the second hollow pattern on the substrate 21.

Alternatively, optionally, a pattern of the first piezoelectric unit 241 is the same as a pattern of the electrode block 231.

For example, the projection of the first piezoelectric unit 241 on the substrate 21 coincides with the projection of the electrode block 231 on the substrate 21.

Correspondingly, for example, a distance of a second gap between adjacent first piezoelectric units 241 is equal to a distance of a first gap between adjacent electrode blocks 231.

Alternatively, optionally, a pattern of the first piezoelectric unit 241 is smaller than a pattern of the electrode block 231.

For example, the projection of the first piezoelectric unit 241 on the substrate 21 is located in the projection of the electrode block 231 on the substrate 21. Alternatively, it is understood that the projection of the electrode block 231 on the substrate 21 covers the projection of the first piezoelectric unit 241 on the substrate 21.

Correspondingly, for example, a distance of a second gap between adjacent first piezoelectric units 241 is greater than a distance of a first gap between adjacent electrode blocks 231.

In some embodiments, acoustic impedance at a gap (the second gap) between adjacent first piezoelectric units 241 is different from acoustic impedance of the first piezoelectric unit 241.

Acoustic impedance is also referred to as acoustic wave impedance or acoustic impedance. Acoustic wave conduction is actually propagation of "small disturbance of a medium from an equilibrium state", and the acoustic wave impedance is resistance that needs to be overcome by displacement of a medium. The acoustic impedance is defined as "a ratio of a velocity at which acoustic pressure flows through an area to a velocity at which a medium flows through the area", and can also be expressed as "a product of medium density and an acoustic velocity". When an acoustic wave passes through a discontinuous interface from one medium to another medium, how much acoustic energy passes through the interface and how much acoustic energy is reflected depend on a difference between acoustic impedance of the two media. A larger difference between acoustic impedance indicates stronger reflection.

For example, acoustic impedance at a gap between adjacent first piezoelectric units 241 is less than acoustic impedance of the first piezoelectric unit 241.

Alternatively, for example, acoustic impedance at a gap between adjacent first piezoelectric units 241 is greater than acoustic impedance of the first piezoelectric unit 241.

Optionally, the second gap between adjacent first piezoelectric units 241 is an air gap.

Alternatively, optionally, the second gap between adjacent first piezoelectric units 241 is filled with a first filling part.

In this case, acoustic impedance of the first filling part is different from the acoustic impedance of the first piezoelectric unit 241.

In some embodiments, the second piezoelectric layer 26 is of a planar-film layer structure.

In some other embodiments, the second piezoelectric layer 26 includes a plurality of second piezoelectric units 261, and the plurality of second piezoelectric units 261 are disposed corresponding to the plurality of first piezoelectric units 241 (or the plurality of electrode blocks 231).

For example, the plurality of second piezoelectric units 261 are arranged in an array, and the plurality of second piezoelectric units 261 are disposed in a one-to-one correspondence with the plurality of first piezoelectric units 241. Alternatively, it is understood that an area in which the electrode blocks 231 are located is divided into pixel units, and a second piezoelectric unit 261 is correspondingly disposed in each pixel unit.

For structures of the second piezoelectric unit 261 and the second piezoelectric layer 26, refer to the foregoing related descriptions of the structures of the first piezoelectric unit 241 and the first piezoelectric layer 24. Details are not described herein again. A structure of the second piezoelectric unit 261 may be the same as a structure of the first piezoelectric unit 241, or a structure of the second piezoelectric unit 261 may be different from a structure of the first piezoelectric unit 241.

The first piezoelectric layer 24 is disposed as a structure including the plurality of first piezoelectric units 241, so that a crosstalk problem of the ultrasonic sensor 20 can be optimized, sensitivity can be improved, and performance of the ultrasonic sensor 20 can be further improved. Similarly, the second piezoelectric layer 26 is disposed as a structure including the plurality of second piezoelectric units 261, so that a crosstalk problem of the ultrasonic sensor 20 can be further optimized, sensitivity can be improved, and performance of the ultrasonic sensor 20 can be improved.

In some embodiments, the intermediate electrode layer 25 may be of a planar-film layer structure, and the intermediate electrode layer 25 may alternatively include a plurality of electrode blocks.

In some embodiments, the second electrode layer 27 may be of a planar-film layer structure, and the second electrode layer 27 may alternatively include a plurality of electrode blocks.

For details, refer to the foregoing related descriptions of the first piezoelectric layer 24. Details are not described herein again.

The foregoing descriptions are merely exemplary implementations, but are not intended to limit the protection scope of this disclosure. Any variation or replacement in the technical scope disclosed shall fall in the protection scope. Therefore, the protection scope of this disclosure shall be subject to the protection scope of the claims.

What is claimed is:

1. An ultrasonic sensor, comprising:

a substrate comprising a first side;

a first ultrasonic transmit signal input port disposed on the substrate;

a second ultrasonic transmit signal input port disposed on the substrate;

a circuit layer coupled to the first ultrasonic transmit signal input port and comprising a plurality of pixel circuits spaced from one another, a first electrode layer comprising electrode blocks spaced apart from one other and another and respectively coupled to the pixel circuits;

a first piezoelectric layer having a polarizing direction;

a second piezoelectric layer having the polarization direction;

a second electrode layer coupled to the first ultrasonic transmit signal input port and an intermediate electrode layer coupled to the second ultrasonic transmit signal input port, wherein the circuit layer, the first electrode layer, the first piezoelectric layer, the intermediate electrode layer, the second piezoelectric layer, and the second electrode layer are sequentially disposed on the first side.

2. The ultrasonic sensor of claim 1, wherein a sum of thickness-to-wavelength ratio of the first piezoelectric layer to the second piezoelectric layer is greater than or equal to ¼+N less than or equal to ¾+N, and wherein N is an integer greater than or equal to zero.

3. The ultrasonic sensor of claim 1, wherein a sum of thickness-to-wavelength ratio of the first piezoelectric layer to the second piezoelectric layer is less than ¼+N, and wherein N is an integer greater than or equal to zero.

4. The ultrasonic sensor of claim 1, wherein the intermediate electrode layer comprises a first conducting layer, a connection layer, and a second conducting layer that are sequentially stacked, wherein the first conducting layer is disposed proximate to the first piezoelectric layer, and wherein the second conducting layer is disposed proximate to the second piezoelectric layer.

5. The ultrasonic sensor of claim 4, wherein thicknesses of the first piezoelectric layer and the second piezoelectric layer are 1 micrometers (μm) to 20 μm and/or a thickness of the connection layer is 1 μm to 100 μm.

6. The ultrasonic sensor of claim 5, wherein a material of the connection layer comprises a conductive material or an insulating material.

7. The ultrasonic sensor of claim 4, wherein thicknesses of the first conducting layer and the second conducting layer are 1 micrometers (μm) to 40 μm.

8. The ultrasonic sensor of claim 1, wherein the intermediate electrode layer comprises a single-film layer structure.

9. The ultrasonic sensor of claim 1, further comprising an insulating protective layer disposed on a second side of the second electrode layer that is distal from the substrate.

10. The ultrasonic sensor of claim 1, further comprising a reinforcement layer disposed on a second side of the second electrode layer that is distal from the substrate.

11. The ultrasonic sensor of claim 1, wherein the first piezoelectric layer comprises a plurality of first piezoelectric components spaced apart from one another, and wherein the plurality of first piezoelectric units are disposed corresponding to the plurality of electrode blocks.

12. The ultrasonic sensor of claim 11, wherein a projection of the first piezoelectric components on the substrate covers a projection of the electrode blocks on the substrate.

13. The ultrasonic sensor of claim 11, wherein an acoustic impedance at a gap between adjacent first piezoelectric component is different from an acoustic impedance of the first piezoelectric components.

14. The ultrasonic sensor of claim 1, wherein the second piezoelectric layer comprises a plurality of second piezoelectric components spaced apart from each other, and wherein the plurality of second piezoelectric components are disposed corresponding to the plurality of electrode blocks.

15. The ultrasonic sensor of claim 1, wherein the first ultrasonic transmit signal input port and the second ultrasonic transmit signal input port are configured to receive different excitation voltages.

16. The ultrasonic sensor of claim 1, wherein the ultrasonic sensor further comprises an echo signal output port coupled to the circuit layer.

17. An electronic device, comprising:

a printed circuit board; and an ultrasonic sensor coupled to the printed circuit board, wherein the ultrasonic sensor comprises:

a substrate;

a first ultrasonic transmit signal input port and a second ultrasonic transmit signal input port disposed on the substrate; and a circuit layer coupled to the first ultrasonic transmit signal input port and comprising a plurality of pixel circuits spaced apart from one another; wherein the first electrode layer comprises a plurality of electrode blocks spaced apart from one another and respectively coupled to the pixel circuits;

polarization directions of the first piezoelectric layer and the second piezoelectric layer are the same;

the first electrode layer and the second electrode layer both are coupled to the first ultrasonic transmit signal input port; and the intermediate electrode layer is coupled to the second ultrasonic transmit signal input port; and wherein the circuit layer, the first electrode layer, the first piezoelectric layer, the intermediate electrode layer, the second piezoelectric layer, and the second electrode layer are sequentially disposed on the first side.

18. The electronic device of claim 17, further comprising a touch contact layer disposed on a side of the substrate distal from the second electrode layer or on a side of the second electrode layer distal from the substrate.

19. The electronic device of claim 18, wherein the touch contact layer comprises a display or a cover.

* * * * *